(12) United States Patent
Town

(10) Patent No.: US 6,738,550 B2
(45) Date of Patent: May 18, 2004

(54) HOLEY WAVEGUIDE MANUFACTURE

(75) Inventor: Graham Town, Bexley (AU)

(73) Assignee: The University of Sydney, New South Wales (AU)

( * ) Notice: Subject to any disclaimer, the term of this patent is extended or adjusted under 35 U.S.C. 154(b) by 47 days.

(21) Appl. No.: 10/166,724

(22) Filed: Jun. 12, 2002

(65) Prior Publication Data

US 2003/0012535 A1 Jan. 16, 2003

(30) Foreign Application Priority Data

Jun. 13, 2001  (AT) .............................................. PR5662

(51) Int. Cl.[7] ................................................. G02B 6/20
(52) U.S. Cl. ........................ 385/125; 385/124; 385/126; 65/428
(58) Field of Search ................................ 385/123–127; 65/393, 428

(56) References Cited

U.S. PATENT DOCUMENTS 5,155,792 A    10/1992  Vali et al. .................... 385/125
5,802,236 A     9/1998  DiGiovanni et al. ......... 385/127
6,301,420 B1  10/2001  Greenaway et al. ......... 385/126
2003/0056550 A1 *  3/2003  Tanaka et al. ................. 65/428

FOREIGN PATENT DOCUMENTS

| WO | WO 00/49436 A1 | 8/2000 |
| WO | WO 01/31390 A1 | 5/2001 |

* cited by examiner

Primary Examiner—Phan T. H. Palmer
(74) Attorney, Agent, or Firm—Foley & Lardner LLP

(57) ABSTRACT

A method of forming a holey waveguide, the method comprising the steps of forming a guiding region of a preform, forming a cladding region of the preform, wherein at least a portion of the cladding region of the preform is formed from a plurality of cladding tubes of at least two different diameters, choosing at least one of the diameters of the cladding tubes in a manner such as to reduce a total number of cladding tubes required to build up said portion of the cladding region when compared with utilising cladding tubes of the same diameter for said portion, and drawing the waveguide from the preform.

29 Claims, 3 Drawing Sheets

HOLEY WAVEGUIDE MANUFACTURE

FIELD OF THE INVENTION

The present invention relates broadly to the manufacture of holey waveguides, to the manufacture of preforms for holey waveguides, and to the resulting holey waveguide/preform.

BACKGROUND OF THE INVENTION

The term holey waveguides such as holey optical fibre used throughout the specification is intended to refer to a waveguide having a series of holes in at least a portion of the cladding material which run parallel to a guiding region. Such waveguides are sometimes also referred to as photonic crystal fibres or microstructured fibres when in optical fibre forms and the term holey waveguide is intended to include waveguides known under those various terms.

Holey waveguides such as holey optical fibres are typically fabricated by stacking tubes of uniform size into a hexagonal pattern to form a preform. One or more solid rods are inserted in the preform matrix of tubes to form waveguides, or guiding cores in the resulting optical fibre. The preform is then pulled down or drawn to a fibre of the required size. This process is sometimes repeated, or done in a number of stages.

In this production process, a very large number of tubes (e.g. greater than 100) are typically required to build up a large cladding region around the solid cores. This makes the prior art fabrication process tedious and time consuming.

While fewer layers of tubes may be used around the cores in such prior ad designs to save time and material, the resulting smaller structure, e.g. a smaller diameter optical fibre, is then difficult to use. A structure with an outer diameter close to that of e.g. a standard step index optical fibre (i.e. 125 μm) is much more desirable.

In at least preferred embodiments, the present invention seeks to provide an alternative fabrication process which addresses those disadvantages of the prior art manufacturing processes.

SUMMARY OF THE INVENTION

In accordance with a fist aspect of the present invention there is provided a method of forming a holey waveguide, the method comprising the steps of forming a guiding region of a preform, forming a cladding region of the preform, wherein at least a portion of the cladding region of the preform is formed from a plurality of cladding tubes of at least two different diameters, choosing at least one of the diameters of the cladding tubes in a manner such as to reduce a total number of cladding tubes required to build up said portion of the cladding region when compared with utilising cladding tubes of the same diameter for said portion, and drawing the waveguide from the preform.

Accordingly, the number of tubes required to fabricate e.g. a holey fibre preform with a specified diameter, e.g. a "standard" diameter of 125 μm, can be significantly reduced.

The method may further comprise the step of choosing one or more other diameters of the cladding tubes based on a desired optical property of the optical waveguide, The cladding tubes may be arranged in a manner such that the resulting cladding region is symmetric. The cladding region may exhibit one or a mixture of the group of square, triangular, hexagonal, octahedral and higher symmetries.

In one embodiment, the cladding tubes may be arranged in a manner such that the diameter of the cladding tubes scales with distance from the guiding region of the waveguide preform.

The core region may be formed from one or more solid rods. The one or more solid rods may be inserted into the matrix of cladding tubes to form the guiding region.

The method may comprise the step of forming a plurality of guiding regions of the preform.

The method may further comprise the step of providing one or more material members in at least one void formed by the cladding tubes. The material members may be in the form of wires of electrically and/or thermally conducting materials for poling and/or electro-optic control, and/or thermo-optic control of the waveguide.

The one or more material members may be provided in the at least one void prior to or after drawing the optical waveguide from the preform.

The waveguide is preferably drawn into a fibre form.

The method may further comprise the step of selecting the arrangement of the cladding tubes in a manner such that larger tubes are arranged near the periphery of the cladding region compared with cladding tubes near the core region, whereby irregularities in the resulting array of voids in the drawn holey waveguide due to manufacturing irregularities in tube size, and/or symmetry, and/or pressure during the drawing occur more likely at the periphery of the cladding region than near the core region.

The cladding tubes may be formed from a variety of suitable materials, including e.g. glasses and polymers.

The cladding tubes may be contained inside a containing tube for facilitating stacking of the cladding tubes and the drawing of the optical waveguide from the preform.

In accordance with a second aspect of the present invention there is provided a method of forming a holey waveguide preform, the method comprising the steps of forming a guiding region of the preform, forming a cladding region of the preform, wherein at least a portion of the cladding region of the preform from a plurality of cladding tubes of at least two different diameters, and choosing one of the diameters of the cladding tubes in a manner such as to reduce a total number of cladding tubes required to build up said portion of the cladding region when compared with utilising cladding tubes of the same diameter for said portion.

The method may further comprise the step of choosing one or more other diameters of the cladding tubes based on a desired optical property of the optical waveguide.

The cladding tubes may be arranged in a manner such that the resulting cladding region is symmetric. The cladding region may exhibit one or a mixture of the group of square, triangular, hexagonal, octahedral and higher symmetries.

In one embodiment, the cladding tubes may be arranged in a manner such that the diameter of the cladding tubes scales with distance from the guiding region of the waveguide preform.

The core region may be formed from one or more solid rods. The one or more solid rods may be inserted into the matrix of cladding tubes to form the guiding region.

The method may comprise the step of forming a plurality of guiding regions of the preform.

The cladding tubes may be contained inside a containing tube for facilitating stacking of the cladding tubes.

In accordance with a third aspect of the present invention there is provided a holey waveguide comprising a guiding region and a cladding region, wherein at least a portion of the cladding region is formed from a plurality of cladding tubes of at least two different diameters, and wherein at least one of the diameters of the cladding tubes is chosen in a manner such that a total number of cladding tubes required to build up said portion of the cladding region is reduced when compared with forming said portion from cladding tubes of the same diameter.

Preferably, the waveguide is in the form of an optical fibre.

In accordance with a fourth aspect of the present invention there is provided a preform for a holey waveguide, the preform comprising a guiding region and a cladding region, wherein at least a portion of the cladding region is formed from a plurality of cladding tubes of at least two different diameters, and wherein at least one of the diameters of the cladding tubes is chosen in a manner such that a total number of cladding tubes required to build up said portion of the cladding region is reduced when compared with forming said portion from cladding tubes of the same diameter.

Preferably, the waveguide is in the form of an optical fibre.

BRIEF DESCRIPTION OF THE DRAWINGS

Preferred forms of the present will now be described, by way of example only, with reference to the accompanying drawings.

DETAILED DESCRIPTION OF THE EMBODIMENTS

The preferred embodiments described provide a design for a holey optical fibre/preform in which the number of tubes utilised to form the cladding region of the resulting optical fibre of a standard diameter, i.e. 125 μm, is reduced when compared with prior art designs.

Figure 1:
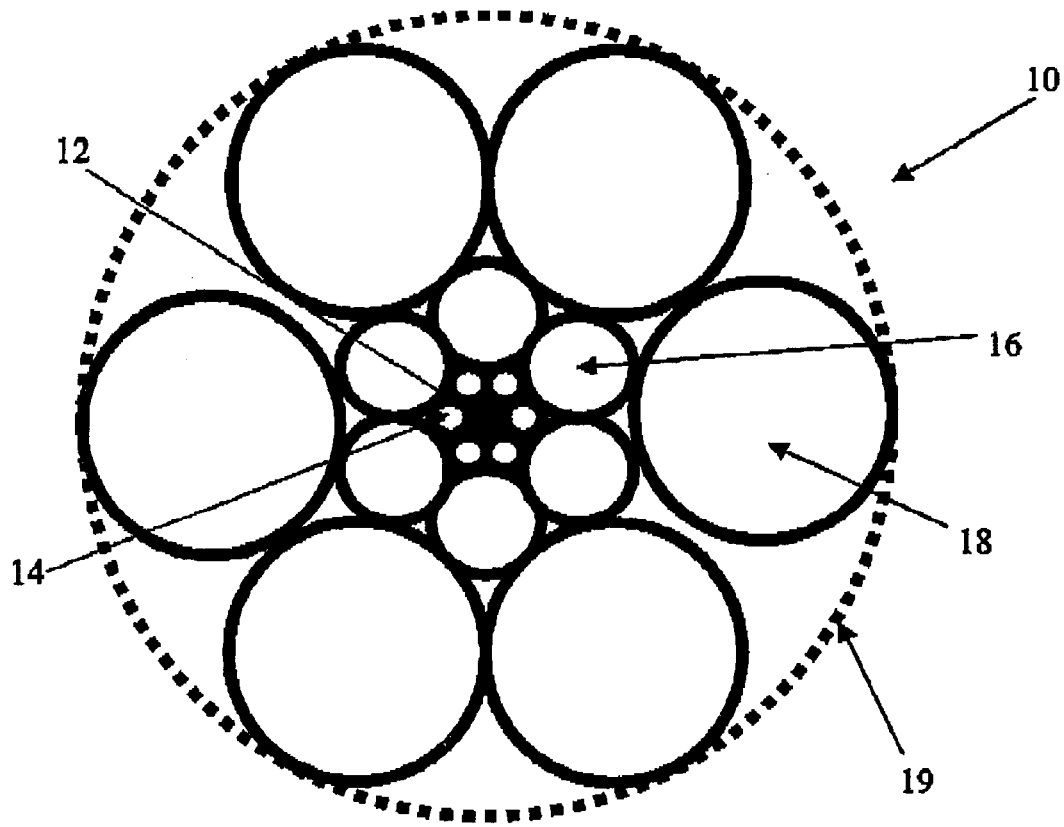
FIG. 1 is a schematic cross sectional view of a preform for an optical fibre embodying the present invention.

In FIG. 1, a preform design 10 comprises a central rod 12 surrounded/supported by a plurality of tubes of different diameters e.g. tubes 14, 16, and 18.

The rod 12 will form the guiding core of the resulting holey fibre when drawn from the preform 10, while the tubes e.g. 14, 16, 18 form the cladding region around the guiding core.

In the example design shown in FIG. 1, the preform 10 and resultant drawn holey fibre are of a hexagonal symmetry and a scaled tube structure is used, i.e. the diameter of the tubes increases with increasing distance from the center of the preform 10.

Figure 2:
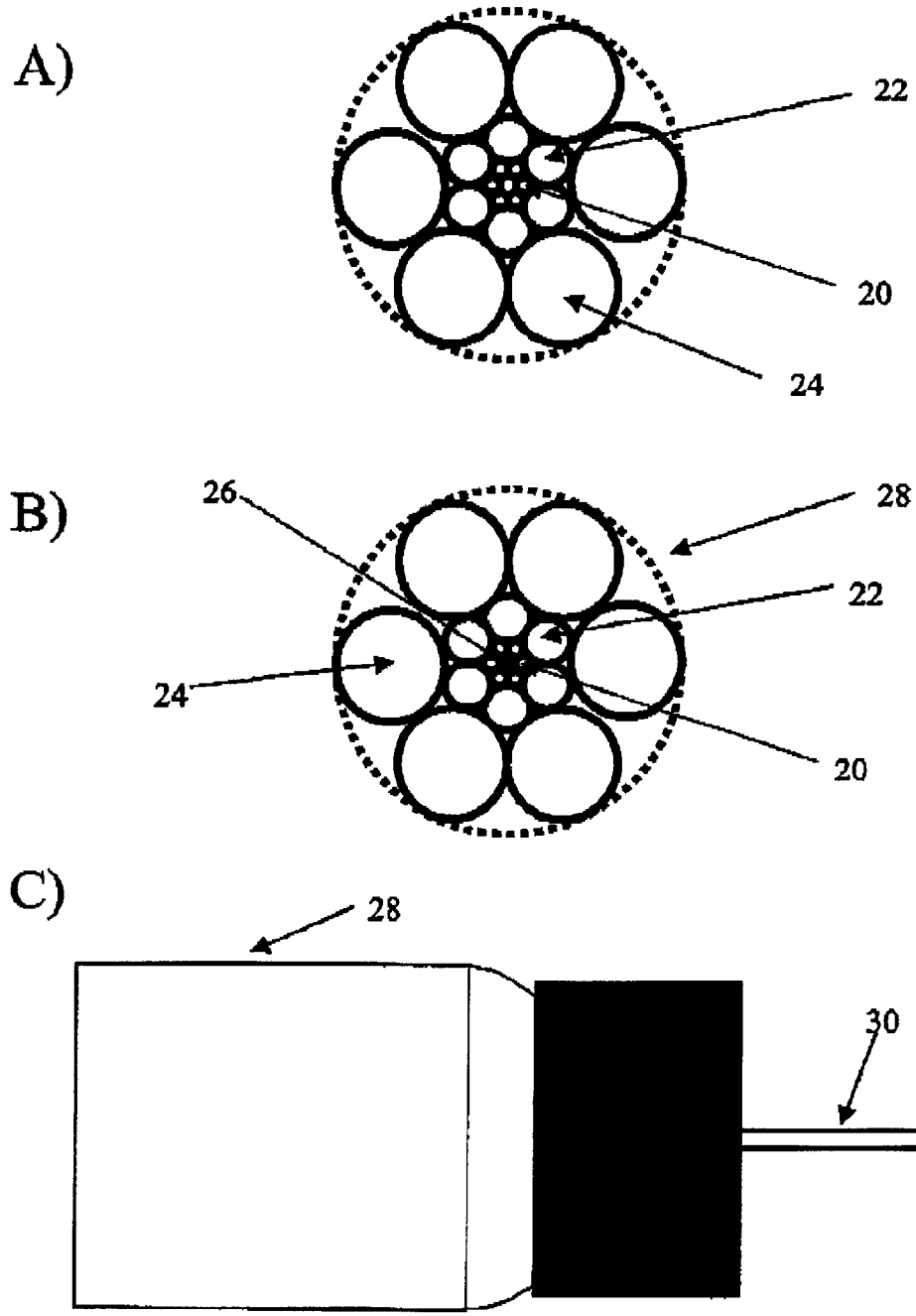
FIGS. 2A–C are schematic drawings illustrating a method of manufacturing an optical fibre embodying the present invention

In FIG. 1 (and also in FIGS. 2A–C described below), the dotted line around the outer tubes e.g. 18 represents the inner wall of a containing tube to facilitate the stacking of the scaled tube structure. In the example embodiment, a circular containing tube 19 of the suitable inner diameter (i.e. related directly to the outer diameters and geometrical distribution of the stacked tubes contained) is convenient, but it will be appreciated by a person skilled in the art that different shapes could be utilised for the containing tube, and/or the individual tubes of tie scaled tube structure. The use of a containing tube also facilitates drawing the structure down to a fibre in the example embodiment.

It will be appreciated by the person skilled in the art that in the preform design 10 embodying the present invention, the total number of tubes required is significantly reduced when compared to a design in which the entire cladding region, i.e. the area outside the central rod 12 within the containing tube 19, is formed from tubes having the same diameter as tubes 14. For standard tube sizes of prior art designs, to fabricate a 125 μm cladding diameter requires about 3000 tubes of uniform diameter.

FIGS. 2A–C illustrate a method of forming preform for and the drawing of a holey optical fibre embodying the present invention. Turning initially to FIG. 2A, a stack or matrix of tubes of different diameter e.g. 20, 22, and 24 is arranged. In the example shown in FIG. 2A the arrangement is of hexagonal symmetry and a scaled tube structure is used.

Next, as shown in FIG. 2B, a material rod 26 is inserted into the matrix of tubes e.g. 20, 22, 24 at a center thereof to form the complete preform 28.

The preform 28 is then drawn into a holey optical fibre 30 as illustrated in FIG. 2C.

Figure 3:
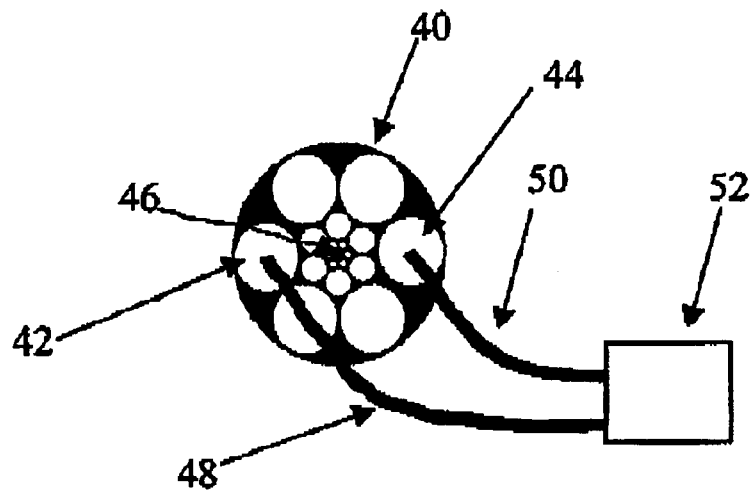
FIG. 3 is a schematic cross sectional view of a holey fibre embodying the present invention.

Turning now to FIG. 3, in a drawn holey fibre 40 embodying the present invention, voids e.g. 42, 44 of larger dimension than in prior art designs utilising tubes of uniform, i.e. small diameter to form a standard size holey fibre of 125 μm diameter, are present and extend longitudinally substantially parallel to the guiding core 46 of the holey fibre 40.

Figure 4:
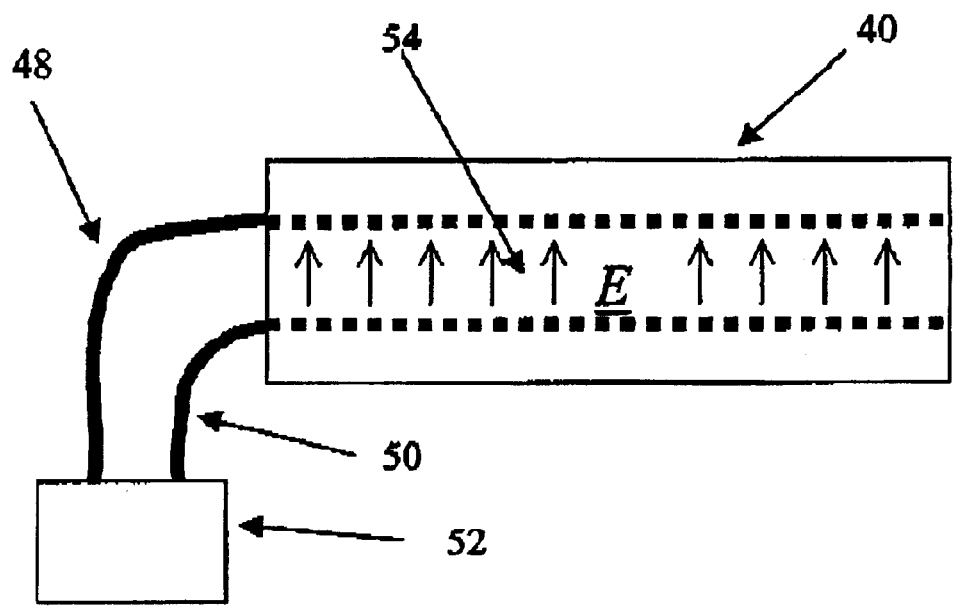
FIG. 4 is a side view of the holey fibre of FIG. 3.

Electrically conducting wires 48, So are inserted in the voids 42, 44 respectively along a length of the optical fibre 40 as shown in FIG. 4. The electrical wires 48, 50 are connected to a power supply unit 52. Accordingly, an electric field may be applied across a center region 54 of the holey fibre 40 for e.g. poling or electro-optic control of optical properties of the holey fibre 40.

It is noted that in the above description of the preferred embodiments in association with FIGS. 1–4, the wall thickness of the tubes is a further design parameter. However, at this stage it is expected that tube thickness is not critical i.e. tube thicknesses can be selected as required to satisfy e.g. other fabrication parameters such as temperature or pull rate used during drawing of the optical fibre, or to modify the guiding properties of the resultant optical fibre. As such, it will be appreciated by the person skilled in the art that the tubes have a finite wall thickness which may be further selected to satisfy other design parameters, without departing from the spirit or scope of the invention as broadly described.

It will be appreciated by the person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example it will be appreciated that the present invention is not limited to the scaled tube structures shown in the embodiments, but rather other tube structures may be used, including e.g. a structure in which the diameter of the tubes initially increases with distance from the center of the waveguide and then decreases again towards the periphery of the cladding region, and other periodic or non-periodic variation in the diameter as a function of the distance from the center, or a random arrangement of tubes of at least two different diameters.

Furthermore, tubes other than circular tubes may be utilised in other embodiments of the present invention, including e.g. elliptical tubes or tubes of any polygonal cross sectional shape.

What is claimed is:

1. A method of forming a holey waveguide, the method comprising the steps of:
    forming a guiding region of a preform,
    forming a cladding region of the preform, wherein at least a portion of the cladding region of the preform is formed from a plurality of cladding tubes of at least two different diameters, choosing at least one of the diameters of the cladding tubes in a manner such as to reduce a total number of cladding tubes required to build up said portion of the cladding region when compared with utilising cladding tubes of the same diameter for said portion, and drawing the waveguide from the preform.

2. A method as claimed in claim 1, wherein the method further comprises the step of choosing one or more other diameters of the cladding tubes based on a desired optical property of the optical waveguide.

3. A method as claimed in claim 1 or 2, wherein the cladding tubes are arranged in a manner such that the resulting cladding region is symmetric.

4. A method as claimed in claim 3, wherein the cladding region exhibits one or a mixture of the group of square, triangular, hexagonal, octahedral and higher symmetries.

5. A method as claimed in claim 1 or 2, wherein the cladding tubes are arranged in a manner such that the diameter of the cladding tubes scales with distance from the guiding region of the waveguide preform.

6. A method as claimed in claim 1 or 2, wherein the core region is formed from one or more solid rods.

7. A method as claimed in claim 6, wherein the one or more solid rods are inserted into the matrix of cladding tubes to form the guiding region.

8. A method as claimed in claim 1 or 2, wherein the method comprises the step of forming a plurality of guiding regions of the preform.

9. A method as claimed in claim 1 or 2, wherein the method further comprises the step of providing one or more material members in at least one void formed by the cladding tubes.

10. A method as claimed in claim 9, wherein the material members are in the form of wires of electrically and/or thermally conducting materials for poling and/or electro-optic control, and/or thermo-optic control of the waveguide.

11. A method as claimed in claim 9, wherein the one or more material members are provided in the at least one void prior to or after drawing the optical waveguide from the preform.

12. A method as claimed in claim 1 or 2, wherein the waveguide is preferably drawn into a fibre form.

13. A method as claimed in claim 1 or 2, wherein the method further comprises the step of selecting the arrangement of the cladding tubes in a manner such that larger tubes are arranged near the periphery of the cladding region compared with cladding tubes near the core region, whereby irregularities in the resulting array of voids in the drawn holey waveguide due to manufacturing irregularities in tube size, and/or symmetry, and/or pressure during the drawing occur more likely at the periphery of the cladding region than near the core region.

14. A method as claimed in claim 1 or 2, wherein the cladding tubes are formed from a variety of suitable materials.

15. A method as claimed in claim 14, wherein the cladding tubes are formed from glasses and polymers.

16. A method as claimed in claim 1 or 2, wherein the cladding tubes are contained inside a containing tube for facilitating stacking of the cladding tubes and the drawing of the optical waveguide from the preform.

17. A method of forming a holey waveguide preform, the method comprising the steps of:

forming a guiding region of the preform, forming a cladding region of the preform, wherein at least a portion of the cladding region of the preform from a plurality of cladding tubes of at least two different diameters, and choosing one of the diameters of the cladding tubes in a manner such as to reduce a total number of cladding tubes required to build up said portion of the cladding region when compared with utilising cladding tubes of the same diameter for said portion.

18. A method as claimed in claim 17, wherein the method further comprises the step of choosing one or more other diameters of the cladding tubes based on a desired optical property of the optical waveguide.

19. A method as claimed in claim 17 or 18, wherein the cladding tubes are arranged in a manner such that the resulting cladding region is symmetric.

20. A method as claimed in claim 19, wherein the cladding region exhibits one or a mixture of the group of square, triangular, hexagonal, octahedral and higher symmetries.

21. A method as claimed in claim 17 or 18, wherein the cladding tubes are arranged in a manner such that the diameter of the cladding tubes scales with distance from the guiding region of the waveguide preform.

22. A method as claimed in claim 17 or 18, wherein the core region is formed from one or more solid rods.

23. A method as claimed in claim 22, wherein the one or more solid rods are inserted into the matrix of cladding tubes to form the guiding region.

24. A method as claimed in claim 17 or 18, wherein the method comprises the step of forming a plurality of guiding regions of the preform.

25. A method as claimed in claim 17 or 18, wherein the cladding tubes are contained inside a containing tube for facilitating stacking of the cladding tubes.

26. A holey waveguide comprising:

a guiding region and a cladding region, wherein at least a portion of the cladding region is formed from a plurality of cladding tubes of at least two different diameters, and wherein at least one of the diameters of the cladding tubes is chosen in a manner such that a total number of cladding tubes required to build up said portion of the cladding region is reduced when compared with forming said portion from cladding tubes of the same diameter.

27. An optical waveguide as claimed in claim 26, wherein the waveguide is in the form of an optical fibre.

28. A preform for a holey waveguide comprising:

a guiding region and a cladding region, wherein at least a portion of the cladding region is formed from a plurality of cladding tubes of at least two different diameters, and wherein at least one of the diameters of the cladding tubes is chosen in a manner such that a total number of cladding tubes required to build up said portion of the cladding region is reduced when compared with forming said portion from cladding tubes of the same diameter.

29. A preform as claimed in claim 28, wherein the waveguide is in the form of an optical fibre.

* * * * *